United States Patent
Bassi et al.

(10) Patent No.: US 11,995,813 B2
(45) Date of Patent: May 28, 2024

(54) AUTOMATED GARMENT PRINT QUALITY CONTROL FOR GARMENT TRACKING, PROCESSING, STORAGE, AND/OR DEFECT BLOCKING

(71) Applicant: Printify, Inc., Riga (LV)

(72) Inventors: Yatin Bassi, London (GB); Edgars Peics, Riga (LV); Florian Philipp Schmidt, Düsseldorf (DE)

(73) Assignee: Printify, Inc., Riga (LV)

( * ) Notice: Subject to any disclaimer, the term of this patent is extended or adjusted under 35 U.S.C. 154(b) by 0 days.

(21) Appl. No.: 18/210,017

(22) Filed: Jun. 14, 2023

(65) Prior Publication Data

US 2024/0078652 A1 Mar. 7, 2024

Related U.S. Application Data

(60) Provisional application No. 63/403,743, filed on Sep. 3, 2022.

(51) Int. Cl.
*G06T 7/00* (2017.01)

(52) U.S. Cl.
CPC .. *G06T 7/0004* (2013.01); *G06T 2207/30124* (2013.01); *G06T 2207/30168* (2013.01)

(58) Field of Classification Search
CPC ......... G06T 7/0004; G06T 2207/30124; G06T 2207/30168

USPC .......................................................... 382/111
See application file for complete search history.

(56) References Cited

U.S. PATENT DOCUMENTS

| | | | |
|---|---|---|---|
| 5,471,309 A | 11/1995 | Bolza-Schünemann | |
| 5,664,025 A | 9/1997 | Kaivosoja | |
| 5,712,921 A | 1/1998 | Zabele | |
| 5,947,029 A | 9/1999 | Loeffler | |
| 6,504,625 B1 | 1/2003 | Amero | |
| 6,623,095 B1 | 9/2003 | Ward | |
| 6,908,171 B2 | 6/2005 | Ward | |
| 7,528,981 B2 | 5/2009 | Johnson | |
| 8,017,927 B2 | 9/2011 | Shakespeare | |
| 8,564,798 B2 | 10/2013 | Horn | |
| 8,564,799 B2 | 10/2013 | Grodsky | |
| 8,804,197 B2 | 8/2014 | Yan | |
| 9,937,706 B2 | 4/2018 | Yamazaki | |
| 10,043,259 B2 * | 8/2018 | Reunanen | G06F 18/28 |
| 10,497,032 B2 * | 12/2019 | Goswami | G06T 7/0002 |
| 10,497,043 B2 * | 12/2019 | Yarvis | G06N 20/00 |
| 10,628,934 B2 | 4/2020 | Weaver | |
| 11,305,552 B1 | 4/2022 | Johnson | |
| 2017/0172230 A1 * | 6/2017 | Macfarlane | A41D 15/00 |

* cited by examiner

*Primary Examiner* — Sheela C Chawan
(74) *Attorney, Agent, or Firm* — Husch Blackwell LLP

(57) ABSTRACT

Methods and systems for analyzing the quality of a design printed on a substrate, such as a garment for example, are described. Such methods and systems may also be used for analyzing the properties of the garment together with the quality of the printed design. Components of such methods and systems, as well as information used and/or generated by such components, are described.

25 Claims, 9 Drawing Sheets

300

AUTOMATED GARMENT PRINT QUALITY CONTROL FOR GARMENT TRACKING, PROCESSING, STORAGE, AND/OR DEFECT BLOCKING

§ 0. RELATED APPLICATION(S)

This application claims the benefit of U.S. Provisional Application No. 63/403,743 (referred to as "the '743 provisional" and incorporated herein by reference), titled "SHIRT PRINT QUALITY TRACKING, PROCESSING, AND STORAGE," filed on Sep. 3, 2022, and listing Yatin BASSI and Edgers PEICS as the inventors. The scope of the invention is not limited to any requirements of the specific embodiments in the '743 provisional.

§ 1. BACKGROUND OF THE INVENTION

§ 1.1 Field of the Invention

The present description concerns improving quality control in the context of print providers such as, for example, third party print providers printing designs on shirts and/or other items, and participating in a print-on-demand (PoD) system.

§ 1.2 Background Information

U.S. Pat. No. 11,301,925, issued on Apr. 12, 2022, titled "USER INTERFACE FOR PRESENTING PROVIDER INFORMATION TO DESIGNERS AND/OR AUTHORS," and listing Daniel Marhel, Juris Brudnis, and Vitor Silva as the inventors (referred to as "the '925 patent" and incorporated herein by reference) describes, among other things, novel methods, apparatus, message formats, and/or data structures for improving user interface technology. FIGS. 1A and 1B of the '925 patent (and included as FIGS. 1A and 1B in the present application) illustrate an example environment 100 in which example embodiments consistent with the present description may be used. Referring first to FIG. 1A, a hub entity 110 may interact with one or more merchants (e.g., designers and/or authors) 120, one or more print providers 130, and one or more online storefronts 140. Referring to FIG. 1B, the hub entity 110 may communicate with each of these entities 120,130,140 via one or more networks 150, such as the Internet for example.

FIG. 3 of the '925 patent illustrates communications among various parts of the example system 100 of FIGS. 1A and 1B. A print prover 130 may interact with the hub entity 110 via communications related to a provider information entry user interface. Ultimately, the print provider 130 provides information about itself to the hub entity 110. A merchant (e.g., designer and/or author) 120 may interact with the hub entity 110 via a physical product selection user interface. The merchant 120 may select a physical product (on which to render its design(s)) and provide this selection to the hub entity 110. Then, the merchant 120 may further interact with the hub entity 110 via a print provider selection user interface. The merchant 120 may select a physical print provider among those presented. Then, the merchant 120 may further interact with the hub entity 110 via a product creator user interface. Finally, the merchant 120 may provide information for a product file (or as a product file) to the hub entity 110. The hub entity 110 may provide product file information to an online storefront 140. The hub entity 110 may also provide product file information to a print provider 130. Alternatively, such product file information may be provided directly from the merchant (e.g., designer and/or author) 120. The product file communicated to the print provider 130 and/or the product file communicated to the online storefront 140 may be the same as, or different from, the product file provided from the merchant 120. Further, a product file communicated to the print provider 130 may be different from a product file communicated to the online storefront 140. The various product information files may include subsets of aggregated product information.

When the online storefront 140 receives an order for the product, it may send a product order file (storefront to hub) to the hub entity 110. The hub entity 110 may then send product order information (hub entity to print provider) to the print provider 130. Alternatively, when the online storefront 140 receives an order for the product, it may send a product order file to both the hub entity 110 and directly to the print provider 130. The print provider 130 then prints the design on the product and ships the product. For example, the print provider 130 may provide a T-shirt with a QR code (e.g., on a removable sticker), print the design on the T-shirt, dry the printed design, scan the QR code to generate a shipping label, fold the T-shirt, package the T-shirt, and ship the T-shirt. One or more order status notifications (e.g., order receipt, order fulfillment, order shipping, etc.) may be provided to the merchant 120, either directly from the online storefront 140 and/or the print provider 130, or indirectly via the hub entity 110.

The '925 patent describes ways to score the print providers 130 and provide various information about the print providers so that the merchant 120 can make an informed decision about which print provider(s) to use. Unfortunately, however, errors such as misprinted designs, faded colors, wrong shirt size, wrong printed design size, wrong shirt type/style, wrong shirt color, skewed print designs, missized print designs, mis-located (on a shirt) print designs, etc., still occur. Such errors can tarnish the reputation of the merchant 120, the hub 110, and/or the online storefront 140. Furthermore, if such errors result in returned products, shipping costs are wasted. Indeed, wasted shipping typically wastes fossil fuel and contributes to climate change. Therefore, it would be useful to detect print provider errors, help the print provider avoid errors, help merchants 120 and/or the hub entity 110 to identify potentially problematic print providers, and prevent shipping products (e.g., shirts) with errors, such as those listed above.

§ 2 SUMMARY OF THE INVENTION

Example methods, systems, data structures and communications are described for addressing one or more of the foregoing challenges. One example method includes: (a) receiving one or more captured images from a still or video camera in a given area; (b) extracting, within the one or more captured images, an image of a design printed on a shirt; (c) receiving order information associated with the shirt; and (d) determining at least one score as a function of at least (i) the image of the design printed on the shirt, and (ii) image information associated with the order information.

Another example method includes: (a) receiving one or more captured images from a still or video camera in a given area; (b) extracting, within the one or more captured images, an image of a design printed on a shirt; (c) receiving order information associated with the shirt; (d) determining whether or not the image of the design printed on the shirt, substantially matches image information associated with the order information; and (e) responsive to a determination that the image of the design printed on the shirt does substantially match image information associated with the order information, (1) determining whether the image of the design printed on the shirt passes or fails at least one test using the image information associated with the order information, and (2) responsive to a determination that the image of the design printed on the shirt passes the at least one test, (i) permitting the shirt to be shipped (or otherwise provided to the customer), (ii) storing a pass indication on a first non-transitory storage system at a first location, and (iii) storing information about the determination of whether the image of the design printed on the shirt passes or fails the at least one test on a second non-transitory storage system at a second location, wherein the second location is remote from the first location. Otherwise, responsive to a determination that the image of the design printed on the shirt fails the at least one test, the example method includes (i) preventing the shirt from being shipped (or otherwise provided to the customer), (ii) storing a failure indication on the first non-transitory storage system, and (iii) storing information about the determination of whether the image of the design printed on the shirt passes or fails the at least one quality test on the second non-transitory storage system. Responsive to a determination that the image of the design printed on the shirt does not substantially match image information associated with the order information, the example method prevents the image of the design printed on the shirt from being stored on any one of the first and second non-transitory storage systems.

In some example implementations of the example method(s), the first physical location is controlled by a print provider, the second physical location is controlled by a hub entity, and the hub interfaces with each of (i) the print provider, and (ii) a merchant/designer who owns intellectual property in the design printed on the shirt.

In some example implementations, the example method(s) further includes determining whether or not a shirt is included in the one or more captured images, wherein acts (b)-d) are performed responsive to a determination that a shirt is included in the one or more captured images.

In some example implementations, the example method(s) further includes receiving environmental information about the given area from at least one sensor, and the at least one score determined is also a function of the environmental information received. In some example implementations, the environmental information includes a lighting temperature.

In some example implementations, the example method(s) further includes detecting at least one property of the shirt, and the at least one score determined is also a function of the at least one property of the shirt detected. For example, the at least one property of the shirt may include at least one of (A) a dominant fabric color of the shirt, (B) a style of the shirt, (C) a size of the shirt, and/or (D) a shirt fabric.

In some example implementations, the example method(s) further includes determining whether or not to ship the shirt (or otherwise provide the shirt to the end customer) using at least some of the at least one score. In some example implementations, the at least one score includes a plurality of scores, and the act of determining whether or not to ship the shirt (or otherwise provide the shirt to the customer) using at least some of the at least one score includes (1) determining whether or not each of the plurality of scores meets a corresponding quality threshold or passes a binary pass-or-fail property test, and (2) responsive to a determination that any one of the plurality of scores does not meet its corresponding quality threshold or does not pass its corresponding binary pass-or-fail property test, the example method(s) prevent shipping the shirt (or otherwise providing the shirt to the customer). Otherwise, responsive to a determination that each and every one of the plurality of quality scores meets its corresponding quality threshold and passes its corresponding binary pass-or-fail property test, the example method(s) ships the shirt (or otherwise provides the shirt to the customer). In such an environment, testing can occur as a sequence of tests, and once a test fails, subsequent tests need not be performed. For example, if the shirt is the wrong color, or size, or style, the design need not be checked; the shirt will not be shipped (or otherwise prevented from being provided to the customer). In fact, it would be useful to perform test(s) related to properties of the shirt even before printing the design so that a shirt and ink are not wasted if some property of the shirt is wrong.

In some example implementations of the example method(s), the order information is associated with the shirt by matching a pattern of the image of the design printed on the shirt with a design of the image information associated with the order information.

In some example implementations of the example method(s), the one or more captured images including the shirt also includes a captured optical code, and the order information is associated with the shirt using the optical code captured.

In some example implementations of the example method(s), the still or video camera has a field of view on a portion of means for conveying, and the act of determining whether or not a shirt is included in the one or more captured images includes tracking the shirt on the means for conveying as the shirt moves across the field of view of the still or video camera. In some example implementations, the means for conveying supports the shirt such that the image of the design printed on the shirt is substantially perpendicular to an optical axis of an objective lens of the still or video camera.

In some example implementations of the example method(s), the at least one score includes a plurality of components. Such example implementations further include determining whether or not each of the plurality of components meets a corresponding quality threshold or passes a corresponding binary pass-or-fail test. Responsive to a determination that any one of the plurality of quality components does not meet its corresponding quality threshold or does not pass its corresponding binary pass-or-fail test, the example method(s) further includes preventing shipping the shirt (or otherwise preventing providing the shirt to the customer). Otherwise, responsive to a determination that each and every one of the plurality of quality components meets its corresponding quality threshold and passes its corresponding binary pass-or-fail test, the example method(s) further includes shipping the shirt (or otherwise providing the shirt to the customer). In some such example implementations, the at least one score includes at least two scores selected from a group consisting of (A) a score indicative of how closely an image of the captured design printed on the shirt matches image information associated with the order, (B) a binary pass or fail component indicating whether or not a fabric color of the shirt matches a fabric color associated with the order, (C) a binary pass or fail component indicating whether or not a size of the shirt matches a size associated with the order, (D) a binary pass or fail component indicating whether or not a style of the shirt matches a style associated with the order, (E) binary pass or fail component indicating whether or not the shirt fabric matches the fabric associated with the order, (F) a score indicative of whether or not a location of the image printed on the shirt matches a shirt location associated with the order, (G) a score indicative of whether or not a size of the image printed on the shirt matches a design size associated with the order, and (H) a score indicative of whether or not an orientation of the image printed on the shirt matches a design orientation associated with the order.

Some example implementations of the example method(s) further include: making an overall pass/fail determination using the score; storing the overall pass/fail determination on a first non-transitory storage system; and storing the score and information used to determine the score on a second non-transitory storage system. In some such example implementations, the first non-transitory storage system is provided at a first physical location which includes the given area, and the second non-transitory storage system is provided at a second physical location remote from the first physical location. In some such example implementations, the first physical location is controlled by a print provider, the second physical location is controlled by a hub entity, and the hub facility interfaces with each of (i) the print provider, and (ii) a merchant/designer who owns intellectual property in the design printed on the shirt.

In some example implementations of the example method(s), the one or more captured images include more than one frame of video, and the image of the design printed on the shirt is an image synthesized from the more than one frame of video.

Example apparatus for performing the example method(s) include: (a) a still or video camera; (b) at least one processor; and (c) a computer-readable storage device storing processor-executable instructions which, when executed by the at least one processor, cause the at least one processor to execute the example method(s).

A non-transitory computer-readable storage medium storing processor-executable instructions which, when executed by at least one processor, cause the at least one processor to perform the example method(s).

§ 3 BRIEF DESCRIPTION OF THE DRAWINGS

§ 4 DETAILED DESCRIPTION

§ 4.1 Example Environment and Systems

Figure 1A:
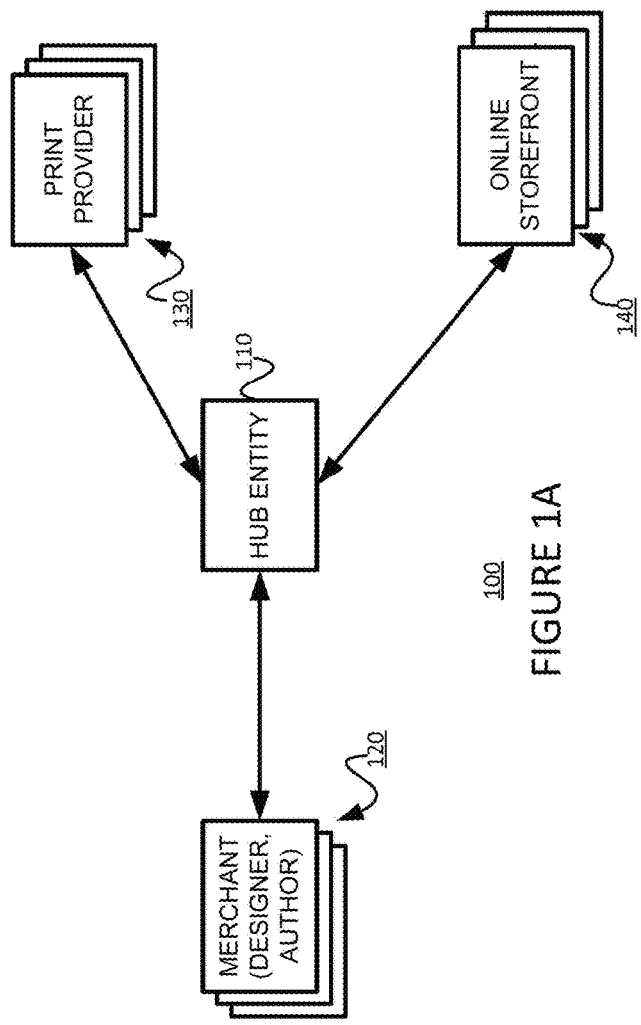
FIGS. 1A and 1B illustrate an example environment 100 in which example embodiments consistent with the present description may be used.
Figure 1B:
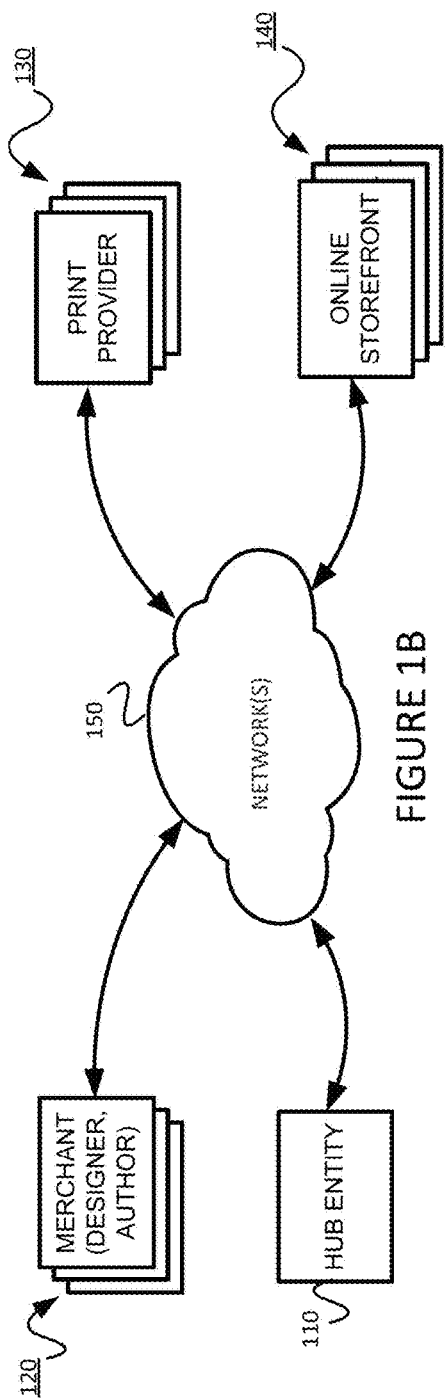

As noted above, FIGS. 1A and 1B illustrate an example environment 100 in which example embodiments consistent with the present description may be used. As described below, some parts of example systems may be provided at one or more print providers 130, and some other parts of example systems may be provided at a hub entity 110.

Figure 2:
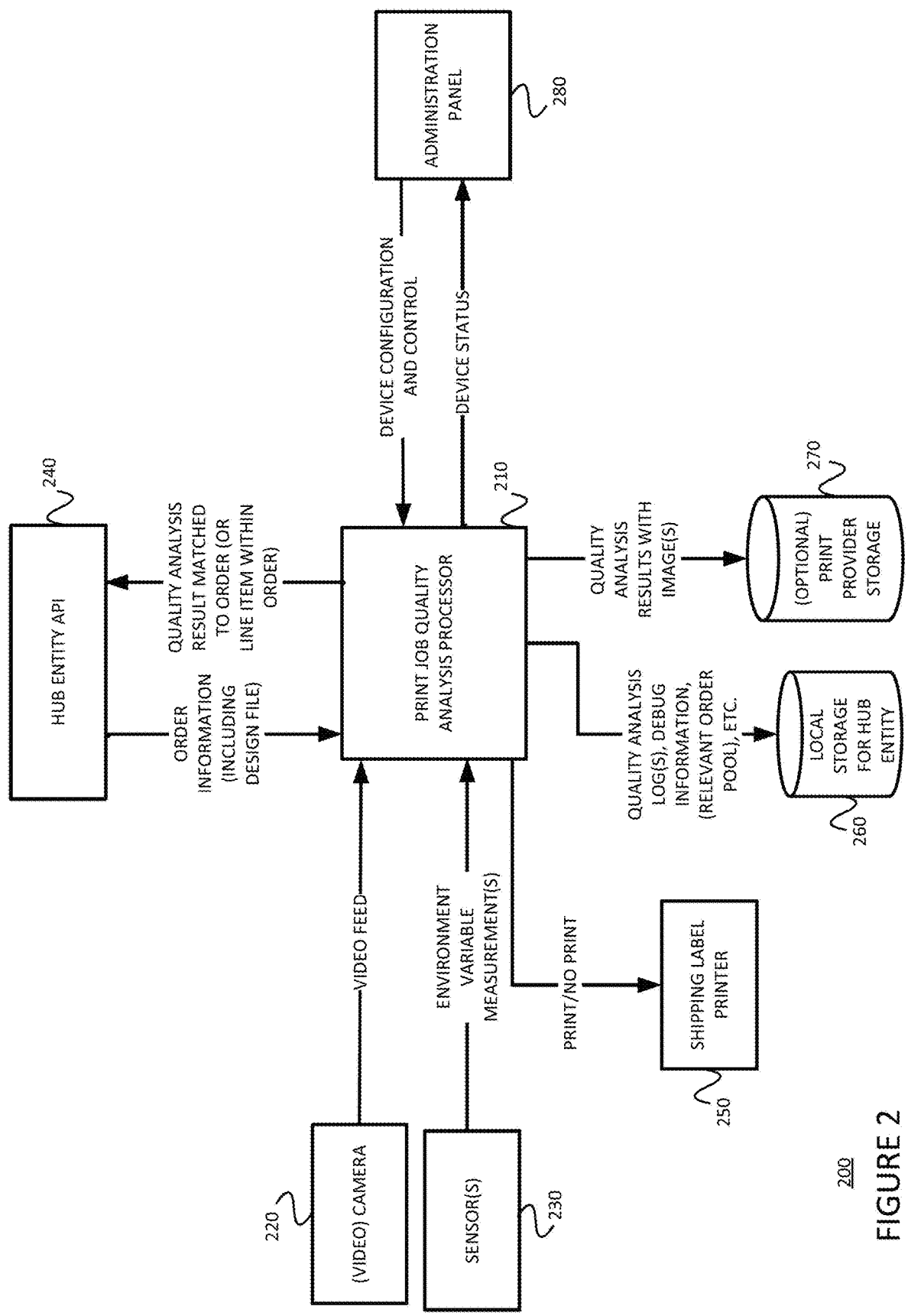
FIG. 2 illustrates an example system consistent with the present description.

FIG. 2 illustrates an example system 200 consistent with the present description. The example system 200 includes a print job quality analysis processor 210, a camera (e.g., video camera) 220, one or more sensors 230, a hub entity API 240, a shipping label printer 250, a non-transitory local storage 260, a non-transitory print provider storage 270, and an administration panel 280.

The print job quality analysis processor 210 can be configured and controlled from the administration panel 280, and receives, as input, (1) one or more images (e.g., a video feed) from the camera 220, (2) environmental variable measurements from the sensor(s) 230, and (3) order information (e.g., including a design file) from hub entity API 240. The print job quality analysis processor 210 can provide device status to the administration panel 280. It 210 can also provide, as output, (1) a print/no print command to shipping label printer 250, (2) a first set of quality analysis information (e.g., including log(s), debug information, etc.) to the local storage 260 for storage, (3) a second set of quality analysis information (e.g., including image(s)) to print provider storage 270 for storage, and (4) a third set of quality analysis information (e.g., a result matched to an order file and a line item) to the hub entity API 240. Note that the local storage 260 may also store information about relevant orders. Such information may be provided directly from the hub entity API 240, or indirectly, via the print job quality analysis processor 210.

The print job analysis processor 210 may compare a captured printed design (e.g., extracted from one or more frames of video data (e.g., at a rate of at least five frames per second) from the camera 220 with a desired design from an order to determine whether or not the printed design is satisfactory (and/or to determine whether or not the shirt is the correct color, style, fabric, size, etc.). For example, the printed design might be considered to be unsatisfactory if any of (or some subset of) the following errors occur:
(a) printed design is wrong design;
(b) printed design has wrong color(s);
(c) printed design has faded color(s);
(d) printed design has wrong color hue;
(e) wrong color shirt;
(f) wrong style of shirt;
(g) wrong size shirt;
(h) printed design skewed on shirt;
(i) printed design wrong size;
(j) printed design at wrong location on shirt (e.g., off-center, on back when design should be on front, on front when design should be on back);
(k) wrong fabric (e.g., 100% cotton, cotton/poly blend, etc.);
(l) etc.

Each of these may be considered to be a component of a quality score. Some of these components might be considered a binary, pass-or-fail, score. Examples of binary, pass or fail, scores are shirt is wrong color (e.g., shirt color is red when it should be green), shirt size is wrong (e.g., shirt size is small when it should be large), shirt style is wrong (e.g., shirt style is crew neck when it should be V-neck), shirt fabric is wrong (e.g., shirt fabric is polyester when it should be 100% cotton), printed design is wrong (e.g., design is "ABC" when it should be "123"), etc. On the other hand, some of these components might be considered to be a quantitative score, which may be tested against a threshold.

Examples of quantitative scores might include degree of skew of printed design (e.g., above or below a threshold degree), amount of color fade from standard (e.g., above or below a fade amount threshold), amount of blur from a standard (e.g., above or below a blur amount threshold), etc.

If the shirt with the printed design is determined to be "satisfactory" by the print job analysis processor 210, the processor 210 may issue a commend to the shipping label printer 250 to print a shipping label. Conversely, if the shirt with the printed design is determined to be "unsatisfactory" by the print job analysis processor 210, the processor 210 may issue a commend to the shipping label printer 250 to not print a shipping label (or may simply not issue a print command). In some example embodiments, if the shirt with the printed design is determined to be "unsatisfactory", the processor 210 may instruct the shipping label printer to print a "reject" or "do not ship" label. Note that the hub entity might control (e.g., via the hub entity API 240) whether and/or when shipping information is provided, and can therefore prevent the print provider from shipping an "unsatisfactory" shirt if the print provider tried to circumvent the quality control result and ship (since the print provider would likely not otherwise have necessary information for the shipping label).

Subsets of print job quality analysis information may be stored locally at the print provider, while the same or different subsets of print job quality analysis information may be provided at the hub entity for remote storage. Trend information over a number of different print jobs may be tracked. In this way, even when print job quality is considered "satisfactory," a trend towards "unsatisfactory" print job quality can be used to alert the print provider and/or the hub entity. Some pieces of print job quality analysis information might be precluded from being stored locally (e.g., at the print provider, or at a facility under the control of the print provider), or might be precluded from being stored remotely (e.g., at the hub entity, or a facility under control of the hub entity). Reasons for precluding storage of certain information might include one or more of (1) resources needed to store the information are considered too high (e.g., for very high resolution images), (2) resources needed to transmit the information are too high (e.g., for very high resolution images), (3) the information is proprietary to the print provider, (4) the information is proprietary to the hub entity, (5) the print provider is not licensed to store and/or use the information, (6) the print provider is precluded, contractually, from storing and/or using the information, (7) the hub entity is not licensed to store and/or use the information, (8) the hub entity is precluded, contractually, from storing and/or using the information, (9) etc.

Note that although not shown, the shipping label printer 250 may be coupled with the print job quality analysis processor 210 indirectly, such as via the administrative panel 280 for example.

Figure 3A:
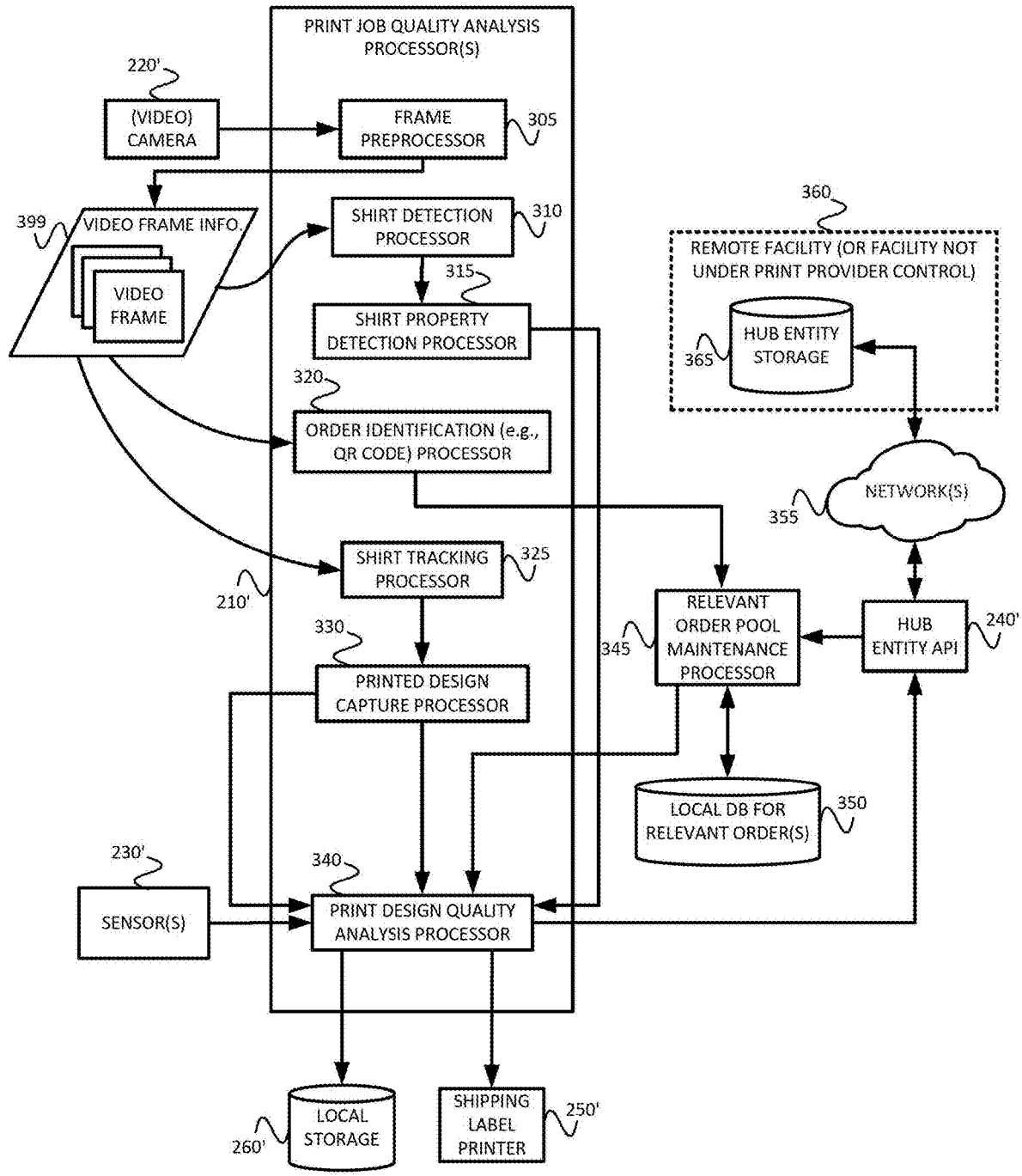
FIGS. 3A and 3B illustrate alternative example systems consistent with the present description.
Figure 3B:
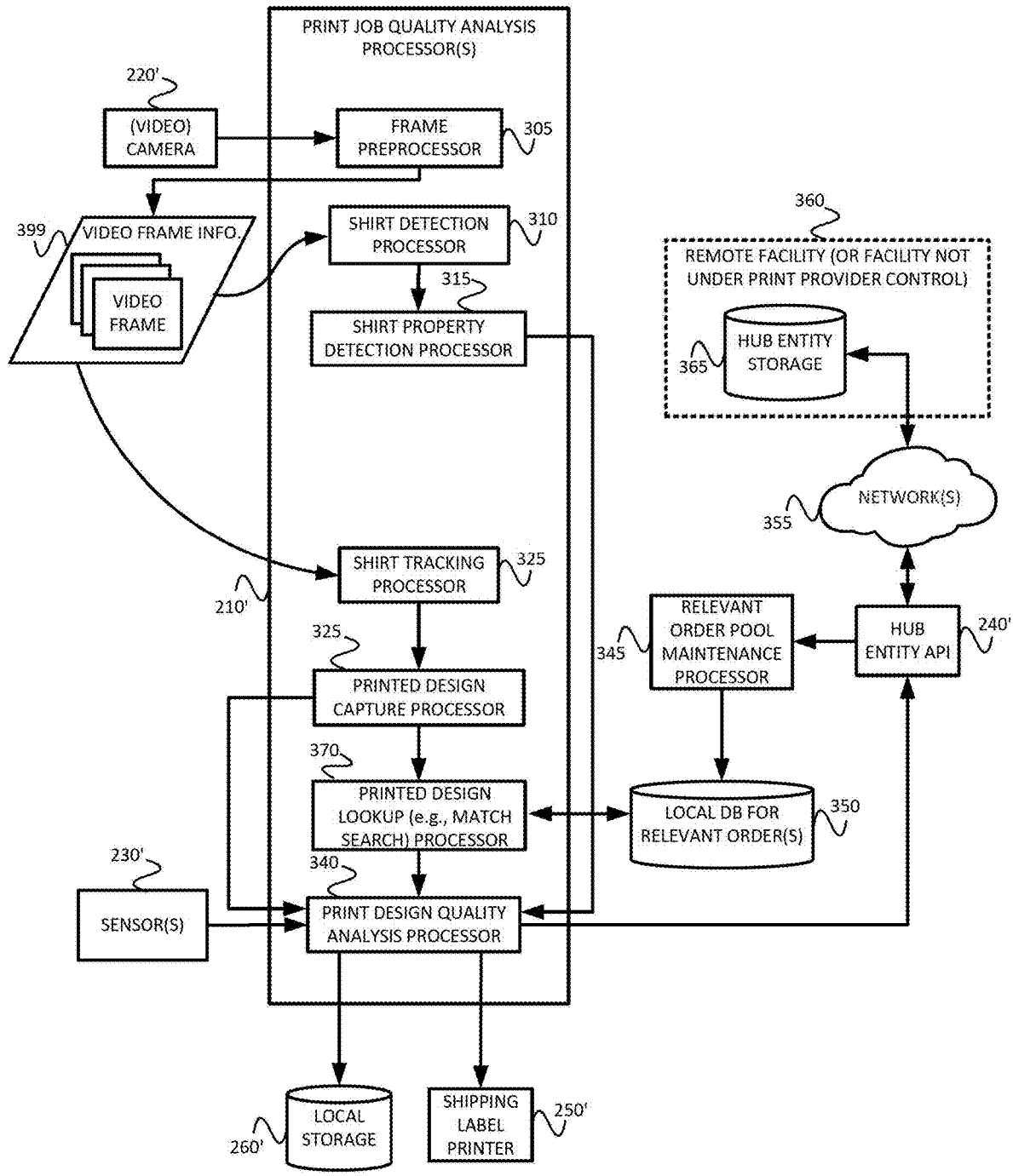

FIGS. 3A and 3B illustrate alternative example systems consistent with the present description. In a first example system (300 illustrated in FIG. 3A), a QR code captured in one or more video frames of the shirt is used to look up an order which includes a target design against which a quality of a printed design is to be analyzed. In a second example system (300' illustrated in FIG. 3B), a target design, against which a quality of a printed designed is to be analyzed, is searched for using a design extracted from one or more frames of video.

Referring first to FIG. 3A, the example system 300 includes a print job quality analysis processor 210', a camera (e.g., video camera) 220', one or more sensors 230', a hub entity API 240', a shipping label printer 250', a non-transitory local storage 260', a relevant order pool maintenance processor 345, and a local database for storing relevant order(s) 350. A remote facility (or, more generally, a facility not under control of the print provider) 360 may include hub entity storage 365. It 360 may communicate with the hub entity API 240' via one or more networks 355, such as the Internet for example.

In the example system 300, the print job quality analysis processor 210' may include a frame preprocessor 305, a shirt detection processor 310, a shirt property detection processor 315, an order identification processor 320, a shirt tracking processor 325, a printed design capture processor 330, and a print design quality analysis processor 340.

In one example implementation, the example system 300 may operate as follows. The frame preprocessor 305 may receive, as input, a video feed from (video camera) 220', and may provide, as output, video frame information 399 such as one or more color accurate video frame(s). At least some of this output 399 is provided, as input, to the shirt detection processor 310 which provides, as output, a shirt mask image when it determines that a shirt is present. At least some of this output is provided, as input, to the shirt property detection processor 315 which provides, as output, shirt properties (e.g., size, dominant fabric color, style, fabric type, and/or type, etc.). One or more shirt properties may be determined from the image of the shirt itself. Alternatively, or in addition, one or more shirt properties may be determined from a scanned shirt label (e.g., a neck label). This output may be provided, as an input, to the print design quality analysis processor 340.

At least some of the video frame information 399 is provided, as input, to an order identification processor 320. The order identification processor 320 may extract optical information (e.g., a bar code, a QR code, etc.) and provide such information (or information derived from such information) as input to the relevant order pool maintenance processor 345 so that it 345 can find a matching order. A design associated with the matching order is provided as input to the print design quality analysis processor 340 (e.g., either directly from the relevant order pool maintenance processor 345 (as indicated), or indirectly, for example via the order information processor 320).

At least some of the video frame information 399 output is provided, as input, to the shirt tracking processor 325 which provides, as output, an array of video frames including at least a portion of the shirt (and/or at least a portion of the designed printed on the shirt). This output is provided, as input, to the printed design capture processor 330 which provides, as output, the printed design as captured from the image(s) of the shirt. This output is provided, as an input, to the print job design quality analysis processor 340.

As described above, the print job design quality analysis processor 340 may be provided with, as inputs, a printed design captured (from processor 330) and a target design associated with an order (which is associated with the shirt). The print job design quality analysis processor 340 may also be provided with, as an input, one or more shirt properties (from processor 315). The print job design quality analysis processor 340 may also be provided with, as an input, one or more environmental measurements provided from sensors(s) 230'. Using such information, the print job design quality analysis processor 340 provides, as output, a print/no print command (or more generally, a satisfactory/unsatisfactory judgment). This output is provided, as an input, to the shipping label printer 250'. The print job design quality analysis processor 340 may also provide, as output, a first subset of print job quality analysis information to be stored locally at the print provider's local storage 260'. It 340 may also provide, as output, the same or a different subset of print job quality analysis information to the hub entity API 240' which may store at least some of this information at hub entity storage 365 via communications network(s) 355. Alternatively, or in addition, some hub entity information may be stored locally, but in a way that the hub entity controls. In this way, the hub entity can control access to such information, even if it is stored locally at the print provider's facility.

Referring now to FIG. 3B, recall that in the second example system 300', a target design, against which a quality of a printed designed is to be analyzed, is searched for using a design extracted from one or more frames of video. This embodiment avoids the need for capturing an optical code, such as a bar code, or a QR code. Comparing the second example embodiment 300' of FIG. 3B with that 300 of FIG. 3A, note that the second example embodiment 300' does not include (or more generally, does not need to include) an order identification processor 320. Instead (or in addition), it includes a printed design lookup (match search) processor 370. The printed design lookup processor 370 receives, as input, the printed design output by the printed design capture processor 325. The printed design lookup processor 370 uses this captured printed design to look up (e.g., using pattern matching, color matching, etc.) a target design associated with an order from local database 350. The order information stored in the local database of relevant order(s) 350 may be maintained by a relevant order pool maintenance processor 345 (e.g., via hub entity API 240'). The elements of FIG. 3B common with those in FIG. 3A may operate in the manner described above with reference to FIG. 3A.

One or more of the foregoing processors and/or preprocessors may be implemented as a processor-executable software (e.g., as software modules), as hardware (e.g., ASICs, FPGAs, ICs, etc.), or a combination thereof. Some implementations may include a lightbox for illuminating the shirt, an objective element (e.g., mirror(s) and/or lens(es)) to concentrate light onto the shirt, and/or to concentrate light reflected from the shirt, a polarization filter, etc.

§ 4.2 Example Methods

Figure 4A:
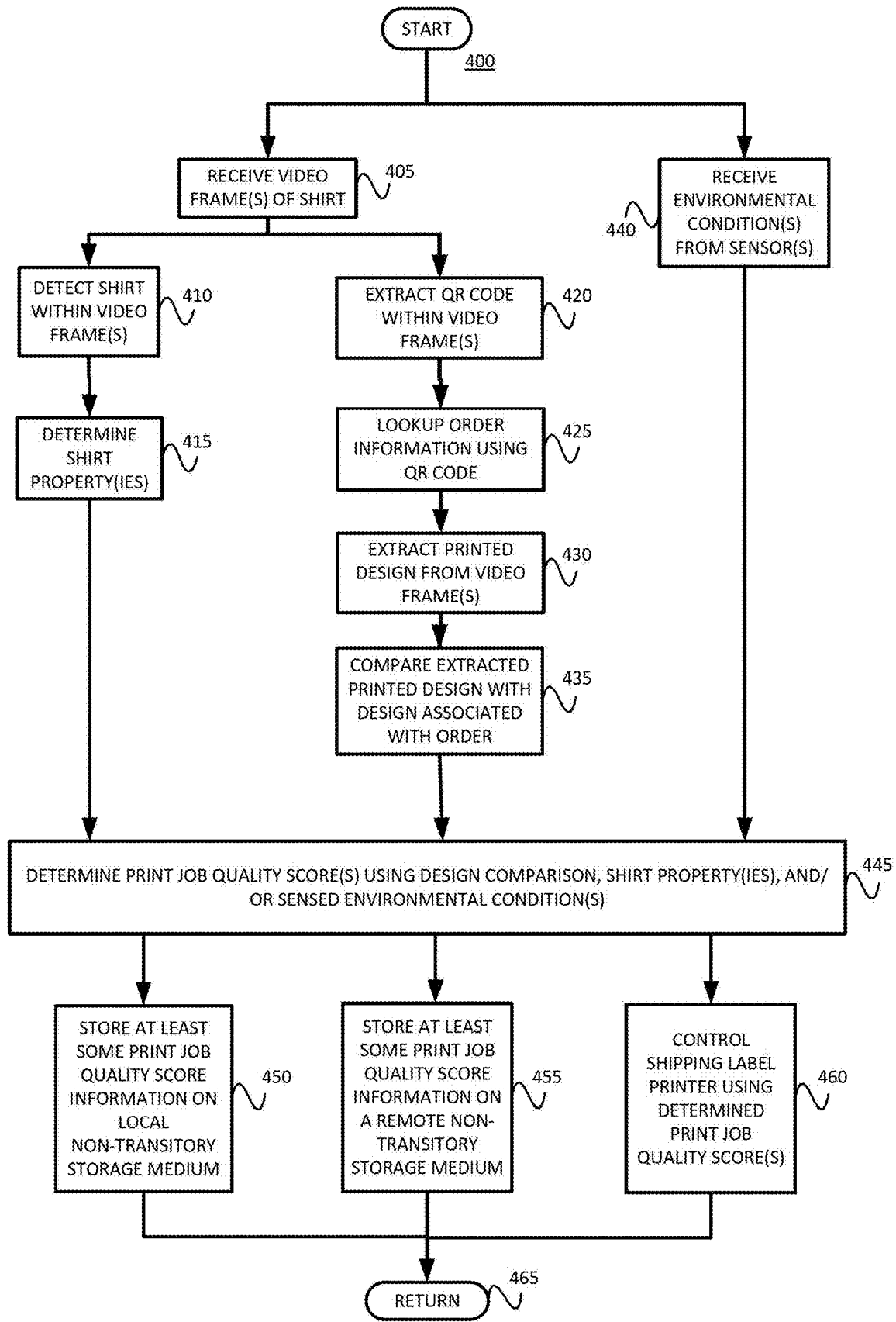
FIGS. 4A and 4B illustrate alternative example methods consistent with the present description, and consistent with FIGS. 3A and 3B, respectively.
Figure 4B:
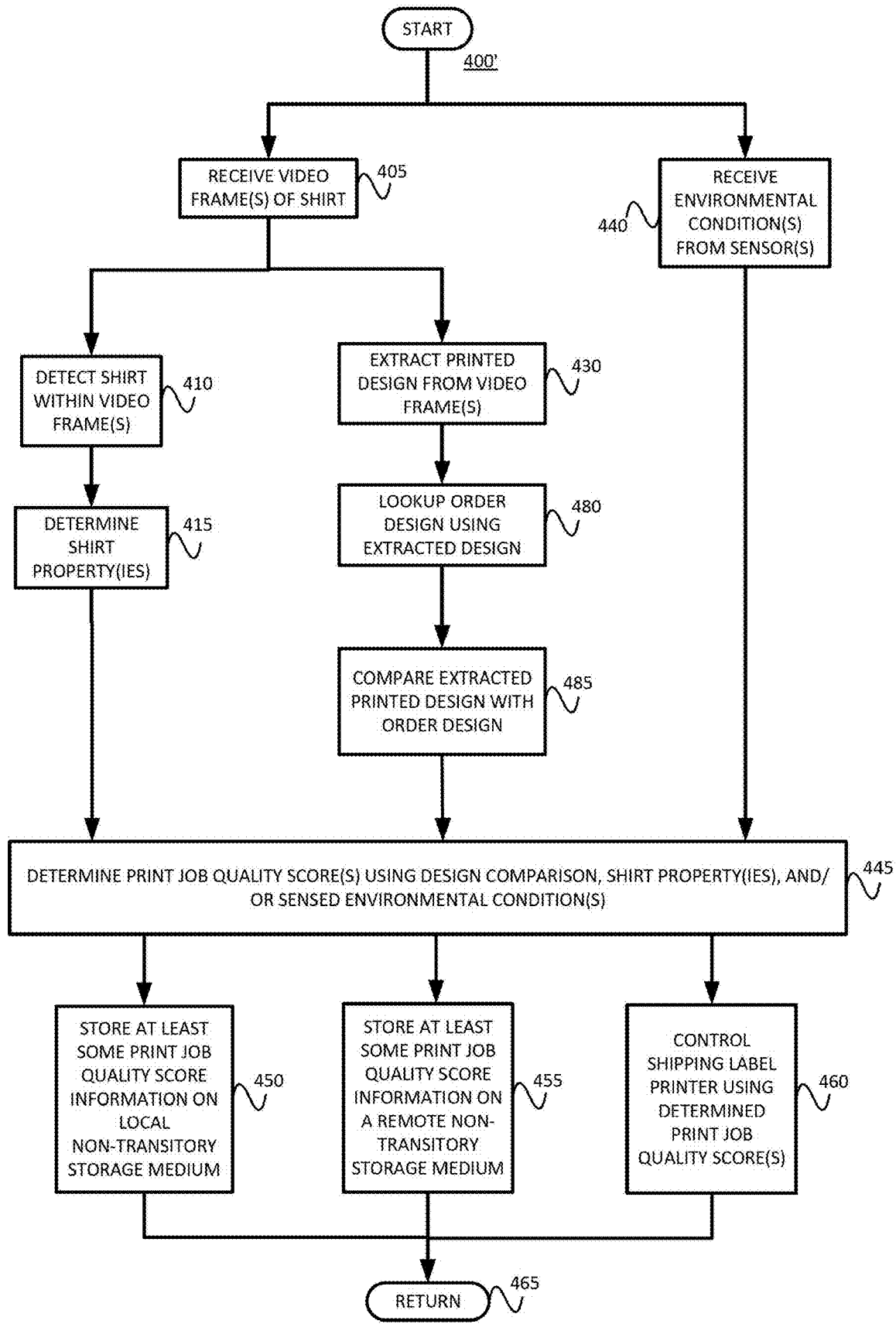

FIGS. 4A and 4B illustrate alternative example methods 400 and 400', respectively, consistent with the present description, and consistent with FIGS. 3A and 3B, respectively. Referring first to FIG. 4A, the two main branches exiting node 400 may be performed in series, in parallel, or in some combination the two. Referring first to the left branch, the example method 400 may receive, as input, video frames of a shirt. (Block 405) (Recall, e.g., processor 305 and information 399 of FIG. 3A.) The two branches exiting block 405 may be performed in series, in parallel, or in some combination of the two. Referring first to the left branch, the example method 400 may use information from one or more video frames to detect a shirt (Block 410), and to determine one or more properties of the shirt (Block 415). (Recall processors 310 and 315 of FIG. 3A.) Referring to the right branch, the example method 400 may use information from one or more video frames to extract an optical code (e.g., a bar code or a QR code) (Block 420), lookup shirt print order information using the extracted code (Block 425), extract a printed design (Block 430) and compare the extracted printed design with the design associated with the shirt print order (Block 435). (Recall, e.g., processors 320, 325, 330, 340 and 345 of FIG. 3A.) Finally, referring to the right-most branch, the example method 400 may receive, as input, environmental condition(s) from sensor(s) (Block 440). (Recall, e.g., sensors 230' of FIG. 3A.)

The example method 400 may then use at least the output of the design comparison, and perhaps one or more shirt properties (e.g., shirt size, shirt color, shirt fabric, shirt style, etc.), and/or one or more sensed conditions to determine one or more print job quality scores. (Block 445) (Recall, e.g., processor 340 of FIG. 3A.) Some or all of the print job quality score(s), and optionally information used to determine such score(s), may be stored on a local (controlled by the print provider, and/or controlled by the hub entity, etc.) non-transitory storage medium. (Block 450) (Recall, e.g., 260' of FIG. 3A.) Similarly, some or all of the print job quality score(s), and optionally information used to determine such score(s), may be stored on a remote (controlled by the hub entity) non-transitory storage medium. (Block 455) (Recall, e.g., 365 of FIG. 3A.) Also, some or all of the print job quality score(s) may be used to control a shipping label printer (e.g., to enable or disable printing a shipping label). (Block 460) (Recall, e.g., 250' of FIG. 3A.)

Referring next to FIG. 4B, note that blocks 420, 425 and 435 of FIG. 4A are replaced with blocks 480 and 485. The other blocks are similar to those already described above with respect to FIG. 4A. More specifically, the two main branches exiting node 400' may be performed in series, in parallel, or in some combination the two. Referring first to the left branch, the example method 400' may receive, as input, video frames of a shirt. (Block 405) (Recall, e.g., processor 305 and information 399 of FIG. 3B.) The two branches exiting block 405 may be performed in series, in parallel, or in some combination of the two. Referring first to the left branch, the example method 400' may use information from one or more video frames to detect a shirt (Block 410), and to determine one or more properties of the shirt (Block 415). (Recall processors 310 and 315 of FIG. 3B.) Referring to the right branch, the example method 400' may use information from one or more video frames to extract a printed design (Block 430), use the extracted design to find a matching design from print orders (480) and compare the extracted printed design with the design associated with the shirt print order (Block 485). (Recall, e.g., processors 325, 340, and 370, and database 350 of FIG. 3B.) Finally, referring to the right-most branch, the example method 400' may receive, as input, environmental condition(s) from sensor(s) (Block 440). (Recall, e.g., sensors 230' of FIG. 3B.)

The example method 400' may then use at least the output of the design comparison, and perhaps one or more shirt properties (e.g., shirt size, shirt color, shirt fabric, shirt style, etc.), and/or one or more sensed conditions to determine one or more print job quality scores. (Block 445) (Recall, e.g., processor 340 of FIG. 3B.) Some or all of the print job quality score(s), and optionally information used to determine such score(s), may be stored on a local (controlled by the print provider, and/or controlled by the hub entity, etc.) non-transitory storage medium. (Block 450) (Recall, e.g., 260' of FIG. 3B.) Similarly, some or all of the print job quality score(s), and optionally information used to determine such score(s), may be stored on a remote (controlled by the hub entity) non-transitory storage medium. (Block 455) (Recall, e.g., 365 of FIG. 3B.) Also, some or all of the print job quality score(s) may be used to control a shipping label printer (e.g., to enable or disable printing a shipping label). (Block 460) (Recall, e.g., 250' of FIG. 3B.)

As can be appreciated from the foregoing, in the examples of FIGS. 3A and 4A, the at least one video frame including the shirt also includes a captured optical code (e.g., bar code, QR code, etc.), and the order information is associated with the shirt using the optical code captured. On the other hand, in the examples of FIGS. 3B and 4B, the order information is associated with the shirt by matching a pattern of the image printed on the shirt with a design of the image information associated with the order information.

At least some example methods consistent with the present description include: (a) receiving at least one video frame from a video camera in a given area; (b) determining whether or not a shirt is included in the at least one video frame; and (c) responsive to determining that a shirt is included in the at least one frame, (1) detecting at least one property of the shirt, (2) extracting, within the at least one video frame, an image printed on the shirt, (3) receiving environmental information about the given area from at least one sensor, (4) receiving order information associated with the shirt, and (5) determining a score as a function of (i) the detected at least one property of the shirt, (ii) the image printed on the shirt, (iii) the environmental information received, and/or (iv) image information associated with the order information.

In some example methods and systems, the at least one property of the shirt includes a dominant fabric color of the shirt, a fabric type of the shirt, a style of the shirt, and/or a size of the shirt.

In some example methods and systems, the video camera has a field of view on a portion of means for conveying (e.g., a conveyor belt, such as a conveyor belt exiting a drier, a carousel following a drier, etc.). In such cases, the act of determining whether or not a shirt is included in the at least one video frame includes tracking the shirt on the means for conveying as the shirt moves across the field of view of the video camera. In some such embodiments, the means for conveying supports the shirt such that the image printed on the shirt is substantially perpendicular to an optical axis of an objective lens of the video camera.

In some example methods and systems, the environmental information includes a lighting temperature. In some cases, lighting temperature can be inferred from a type and/or parameter(s) of lighting source. In other cases, lighting temperature can be determined using a captured image of an object having a known color (e.g., a pure white QR label background, a pure white object placed on the conveyor, etc.)

Some example methods and systems further include determining whether or not to ship the shirt (e.g., by enabling or disabling the printing of a shipping label) using the score.

In some example methods and systems, the score includes a plurality of components. Such example methods and systems may further (6) determine whether or not each of the plurality of components meets a corresponding quality threshold or passes a binary pass-or-fail test, and (7) responsive to a determination that any one of the plurality of quality components does not meet its corresponding quality threshold or does not pass a binary pass-or-fail test, not shipping (e.g., by not printing a shipping label) the shirt, and otherwise, responsive to a determination that each and every one of the plurality of quality components meets its corresponding quality threshold or passes a binary pass-or-fail test, shipping the shirt (or enabling shipping by printing a shipping label).

Some example methods and systems may further include (6) making an overall pass/fail determination using the score; (7) storing the overall pass/fail determination on a first non-transitory storage system; and (8) storing the score and information used to determine the score on a second non-transitory storage system. In some such methods and systems, the first non-transitory storage system is provided at a first physical location which includes the given area (e.g., at the print provider, and/or controlled by the print provider), and the second non-transitory storage system is provided at a second physical location remote from the first physical location (e.g., remote from the print provider, such as a location controlled by a hub entity). As noted above, the hub facility may interface with each of (i) the print provider, and (ii) a merchant/designer who owns intellectual property in the image printed on the shirt.

In some example methods and systems, the captured design printed on the shirt is synthesized from more than one frame of video.

Some example methods and systems include: (a) receiving at least one video frame from a video camera in a given area; (b) extracting, within the at least one video frame, a design printed on a shirt; (c) receiving order information associated with the shirt; (d) determining a plurality of component scores as a function of (i) the captured design printed on the shirt, and (ii) design image information associated with the order information; and (e) determining whether or not to ship the shirt (e.g., by allowing or preventing the printing of a shipping label) using at least some of the plurality of component scores. In at least some such embodiments, the act of determining whether or not to ship the shirt using at least some of the plurality of component scores includes (1) determining whether or not each of the plurality of component scores meets a corresponding quality threshold or passes a binary pass-or-fail test, and (2) responsive to a determination that any one of the plurality of component scores does not meet its corresponding threshold or fails to pass a binary pass-or-fail test, not shipping the shirt, and otherwise, responsive to a determination that each and every one of the plurality of component scores meets its corresponding threshold or passes a pass-or-fail test, shipping the shirt. In some such embodiments, the act of determining whether or not to ship the shirt using at least some of the plurality of component scores includes making an overall pass-or-fail determination, and such example embodiments may further include: (f) storing the overall pass-or-fail determination on a first non-transitory storage system; and (g) storing the plurality of component scores and/or pass-or-fail binary test results on a second non-transitory storage system. In some such embodiments, the first non-transitory storage system is provided at a first physical location (e.g., at the print provider facility) which includes the given area, and wherein the second non-transitory storage system is provided at a second physical location remote from the first physical location. In some such embodiments, the second physical location is controlled by a hub entity, and the hub entity interfaces with each of (i) the print provider, and (ii) a merchant/designer who owns intellectual property in the image printed on the shirt.

In some example methods and systems, the plurality of component scores includes at least two scores selected from a group consisting of (A) a score indicative of how closely an image of the captured design printed on the shirt matches (e.g., meets one or more similarity thresholds in terms of shape, edges, and/or color, etc.) image information associated with the order, (B) a binary pass-or-fail component indicating whether or not a fabric color of the shirt matches a fabric color associated with the order, (C) a binary pass-or-fail component indicating whether or not a size of the shirt matches a size associated with the order, (D) a binary pass-or-fail component indicating whether or not a style (e.g., crew neck, V-neck, turtle neck, short sleave, long sleave, tank top, etc.) of the shirt matches a style associated with the order, (E) binary pass-or-fail component indicating whether or not the shirt fabric matches the fabric associated with the order, (F) a binary pass-or-fail component indicating whether or not a location of the image printed on the shirt matches a shirt location associated with the order, (G) a score indicative of whether or not a size of the image printed on the shirt matches a design size associated with the order, and (H) a score indicative of whether or not an orientation of the image printed on the shirt matches a design orientation associated with the order.

§ 4.3 Example Apparatus

Figure 5:
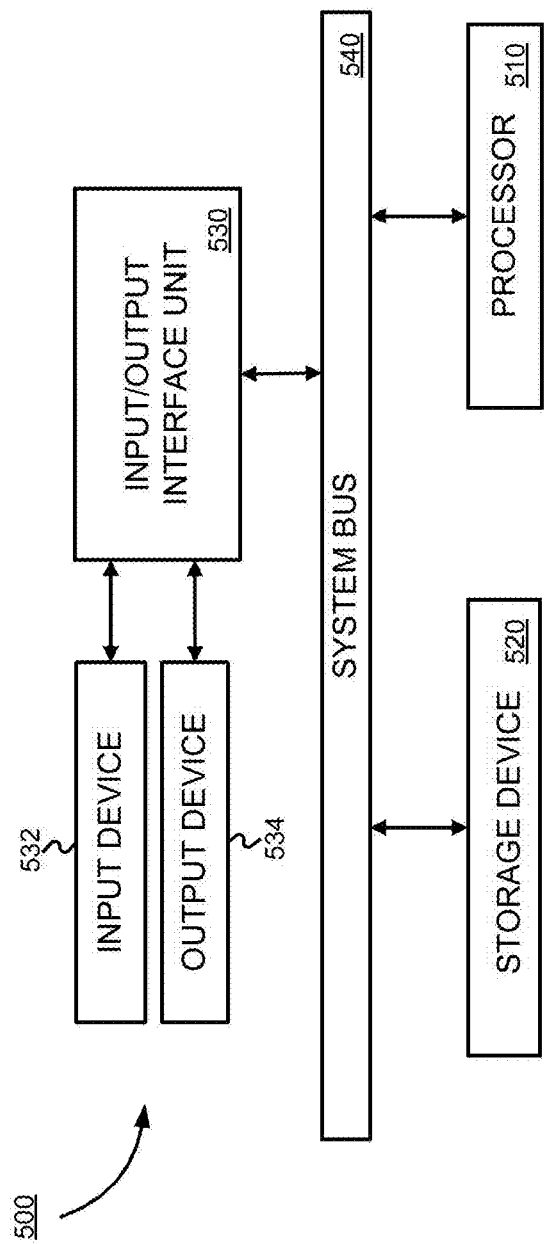
FIG. 5 is a block diagram of an exemplary machine that may perform one or more of the methods described, and/or store information used and/or generated by such methods.

FIG. 5 is a block diagram of an exemplary machine 500 that may perform one or more of the methods (e.g., 300, 300') described, and/or store information used and/or generated by such methods. The exemplary machine 500 includes one or more processors 510, one or more input/output interface units 530, one or more storage devices 520, and one or more system buses and/or networks 540 for facilitating the communication of information among the coupled elements. One or more input devices 532 and one or more output devices 534 may be coupled with the one or more input/output interfaces 530. The one or more processors 510 may execute machine-executable instructions (e.g., C or C++ running on the Linux operating system widely available from a number of vendors) to perform one or more aspects of the present disclosure. At least a portion of the machine executable instructions may be stored (temporarily or more permanently) on the one or more storage devices 520 and/or may be received from an external source via one or more input interface units 530. The machine executable instructions may be stored as various software modules, each module performing one or more operations. Functional software modules are examples of components which may be used in the apparatus described.

In some embodiments consistent with the present disclosure, the processors 510 may be one or more microprocessors and/or ASICs. The bus 540 may include a system bus, one or more networks (e.g., LANs), etc. The storage devices 520 may include system memory, such as read only memory (ROM) and/or random access memory (RAM). The storage devices 520 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present disclosure may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present disclosure may be downloaded as a computer program, which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present disclosure (or components or modules thereof) might be implemented in hardware, such as one or more field programmable gate arrays ("FPGA"s), one or more integrated circuits such as ASICs, etc. Alternatively, or in addition, embodiments consistent with the present disclosure (or components or modules thereof) might be implemented as stored program instructions executed by a processor. Such hardware and/or software might be provided a laptop computer, desktop computer, a tablet computer, a mobile phone, etc.

§ 4.4 Example of Operation

Figure 6:
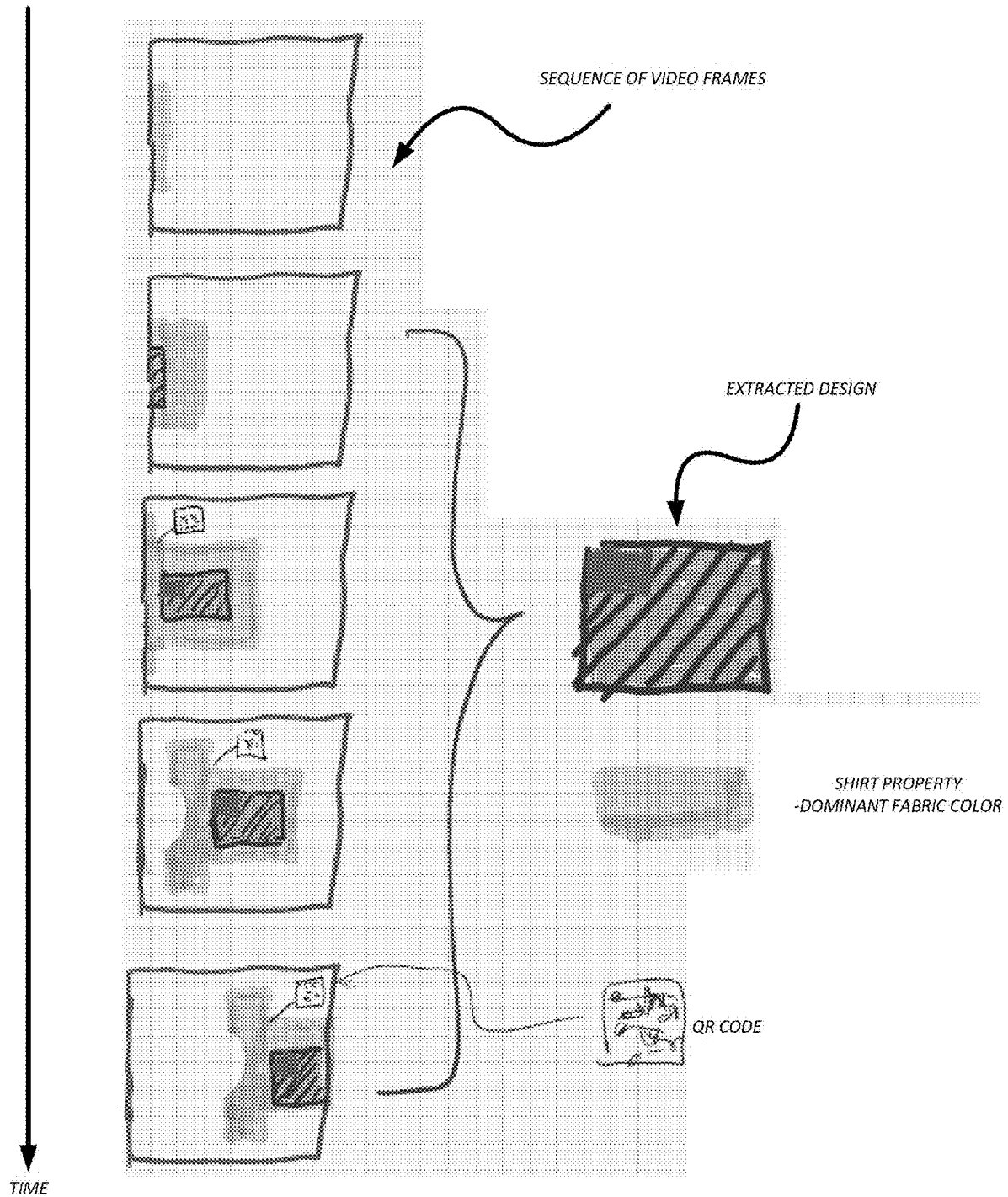
FIG. 6 illustrates information extracted from video frames capturing a shirt on a conveyor.

FIG. 6 illustrates an example of some operations that may be used in some example embodiments consistent with the present disclosure. The left side of FIG. 6 illustrates a sequence of five video frames in each of which at least a portion of a shirt is captured. In this example, the shirt is moving from left to right. The right side of FIG. 6 illustrates an extracted design, a shirt property (in this example, a dominant fabric color), and a captured QR code.

§ 4.5 Refinements, Alternatives and Extensions

Example embodiments consistent with the present description may be used to test the print quality of a design printed on shirt. Typically, a print provider may (1) treat (i.e., pretreat) the shirt before printing, (2) press the shirt, (3) print the design, (4) dry the printed shirt (e.g., in a dryer), and (5) pack and ship the printed shirt. Example embodiments may be used to capture video frames of a printed shirt at the output of a dryer, such as conveyor drier. Note that if a dual drier (e.g., the Adelco Dual Drier from Adelco Screen Process Ltd of Hampshire, UK and/or from Adelco China Corporation of Kunshan, China), more than one video camera may be deployed, or one of the drier's conveyors can be unused (or its output, uninspected by the example system).

Figure 7A:
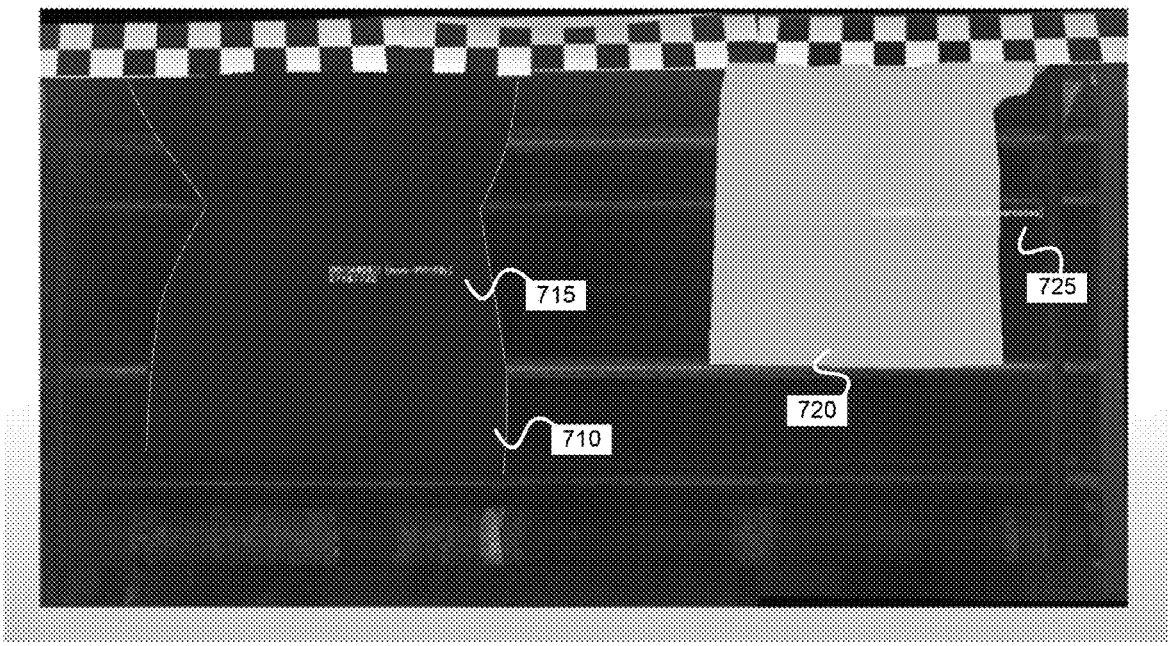
FIG. 7A is an image illustrating blocking or pixelating images of shirts at a print provider that do not belong to a given PoD system or that have unreadable (e.g., bar or QR) codes.
Figure 7B:
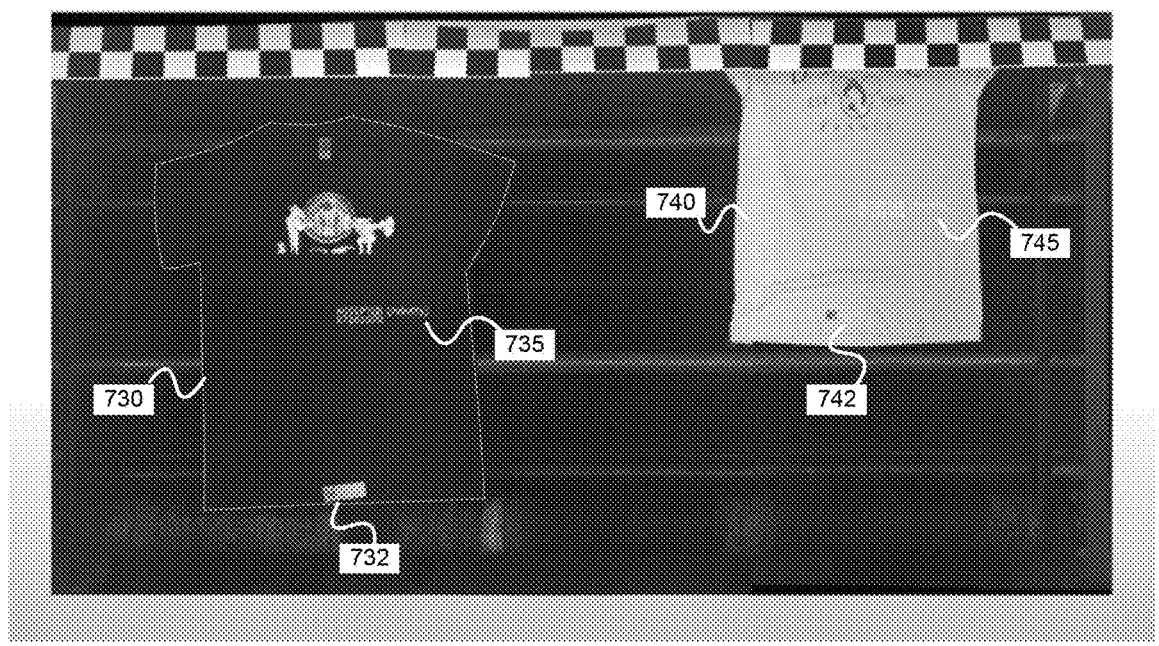
FIG. 7B is an image illustrating images of shirts at a print provider that have a readable code and belong to a given PoD system.

Referring back to 320 of FIG. 3A and/or 370 of FIG. 3B, in some example implementations, if no matching order is found, the video frames are prevented from being stored for later retrieval (e.g., on a non-transitory storage device). For example, FIG. 7A is an image 700a illustrating blocking or pixelating images of shirts 710, 720 at a print provider that do not belong to a given PoD system or that do not have readable and recognized (e.g., bar or QR) codes. The reasons for pixelating or blocking the image of the design on the shirts 710 and 720 are shown by codes 715 and 725, respectively. FIG. 7B is an image 700b illustrating images of shirts 730,740 at a print provider that have a readable code 732,742 and belong to a given PoD system. Information about the quality determination is overlayed on the image, as indicated by 735,745.

In the examples of FIGS. 7A and 7B, a QR code is used to validate and distinguish the order from customers not participating in the PoD system, and achieve data privacy and/or confidentiality requirements by blurring or otherwise obscuring the design. This may be done, for example, by (a) receiving one or more captured images from a still or video camera in a given area; (b) extracting, within the one or more captured images, an image of a design printed on a shirt; (c) receiving order information associated with the shirt; and (d) determining whether or not the image of the design printed on the shirt, substantially matches image information associated with the order information. Responsive to a determination that the image of the design printed on the shirt does substantially match image information associated with the order information, the example method (1) determines whether the image of the design printed on the shirt passes or fails at least one test using the image information associated with the order information, and (2) responsive to a determination that the image of the design printed on the shirt passes the at least one test, permits the shirt to be shipped, stores a pass indication on a first non-transitory storage system at a first location, and stores information about the determination of whether the image of the design printed on the shirt passes or fails the at least one test on a second non-transitory storage system at a second location, wherein the second location is remote from the first location. Otherwise, responsive to a determination that the image of the design printed on the shirt fails the at least one test, the method prevents the shirt from being shipped, stores a failure indication on the first non-transitory storage system, and stores information about the determination of whether the image of the design printed on the shirt passes or fails the at least one test on the second non-transitory storage system. Responsive to a determination that the image of the design printed on the shirt does not substantially match image information associated with the order information, the example method may prevent the image of the design printed on the shirt from being stored on any one of the first and second non-transitory storage systems. (Recall, e.g., the image 700*a* of FIG. 7A.)

Although example embodiments were described in which a determination about whether or not to ship was made, more broadly, other example implementations may determine whether or not to provide the product with an applied design to a customer (e.g., ship to customer address, allow customer pickup, schedule customer pickup, hand product to customer, etc.).

In the foregoing scenario, the first physical location may be controlled by a print provider, and the second physical location may be controlled by a hub entity. In this case, the hub interfaces with each of (i) the print provider, and (ii) a merchant/designer who owns intellectual property in the design printed on the shirt.

Although the example embodiments were described in the context of shirts and print providers, example embodiments consistent with the present description may be used in the context of other providers for applying a merchant (e.g., designer and/or author) user's design onto a physical product or substrate, or incorporate the design into a physical product. As some examples, a provider may print (e.g., via any method including direct to garment, direct to film, etc.) a design onto a garment, may embroider a design onto a fabric, may etch a design onto glass, carve a design into wood, emboss a design onto leather, 3D-print a three dimensional design, sculpt a design onto ice, carve a design into stone, cast a design, print a design on another object, etc. Therefore, example embodiments consistent with the present description may be adapted to check a design, applied in any way, to any type of substrate. Further, although certain example implementations were described in the context of print provider(s) as part of a print-on-demand system, other example embodiments may be used with any supplier, store, or shop.

In some example embodiments, extracting a design from one or more frames of a shirt, finding properties of the shirt (e.g., shirt type, fabric type, etc.) may use machine learning and a classification engine.

Design X may be said to "match" design Y if they meet a predetermined similarity threshold.

Referring back to 370 of FIG. 3B, a "matching" design may be judged, or looked up, or searched for, using one or more of image shape, image edges, image colors, etc.

A "dominant color" of a shirt (or other printing substrate) is the color occurring in the largest percentage of area on the shirt. For example, for a solid color shirt, the dominant color would simply be the color of the fabric of the shirt. As another example, in a rugby shirt, the dominant color would be the color having the largest percentage of area(s) of the shirt.

If the shirt has a label such as a neck label, the camera may be used to capture an image of the neck label, which may include text or symbols indicative of some property of the shirt. For example, the neck label might include text or symbols indicative of size (e.g., S, M, L, XL, XXL, etc.). As another example, the neck label might include the shirt brand (e.g., Haines, Fruit of the Loom, etc.) and/or skew information (e.g., crew, V-neck, athletic fit, male, female, 100% cotton, 50-50 cotton-poly blend, etc.). Alternatively, or in addition, the captured image itself may be used to determine some property of the shirt. For example, the image of the shirt, the field of view of the camera, the distance between the camera and the conveyor belt, etc. (perhaps in addition to scale markings adjacent to the shirt such as on the conveyor belt), can be used to determine the size of the shirt. Edges in the image of the shirt can be used to determine the style of the shirt (e.g., crew neck vs. V-neck, long sleeve vs. short sleeve vs. tank top, unisex vs. male vs. athletic vs. female, etc.)

Although a video camera 220/220' may be used, example embodiments consistent with the present description can use "one or more captured images." In this application, "one or more captured images" may be any of (A) a single still image, (B) a single video image frame, (C) more than one still image, (D) more than one video image frame (Recall, e.g., FIG. 6), or (E) image information derived from any of the foregoing.

Some example implementations may provide various user interface screens with various information. For example, one example user interface screen may include a captured image of the design, and multiple tabs (e.g., for general information, detection information, order information, etc.). For example, information arranged under one or more of the tabs may include, for example, a design identifier or ID, a QR code (e.g., as an order identifier), a garment brand, a garment color, a garment size, a print area collar offset (e.g., in cm), a print area side offset (e.g., in cm), a print area rotation (e.g., in degrees), a print color accuracy (e.g., scored out of 100), a garment side (e.g., front, back, etc.). In some example implementations, such information may be visually altered to indicate whether or not there is a problem (e.g., green highlighted for passed, red highlighted for failed, etc.).

Other user interface screens may aggregate information such as counts of various reasons for failure or rejection. Such user interface screens may include one or more of counts of a given type of failure (e.g., design placement-collar offset, design placement-center offset, design placement-skewed, wrong color, wrong size, wrong item, wrong side, color accuracy below threshold) over a given time period, percent of a given type of failure over all types of failure in the given time period, graphs indicating counts of one or more types of failures at different times of day and/or dates (or ranges thereof) of a given type of failure. This allows users to discover problems, discover problem trends, plan or prioritize remediation efforts, etc.

§ 4.6 CONCLUSIONS

As should be apparent from the foregoing, example embodiments consistent with the present description may be used to identify and/or avoid errors such as misprinted designs, faded colors, wrong shirt size, wrong shirt type/style, wrong shirt color, wrong shirt fabric, skewed print designs, mis-sized print designs, and/or mis-located (on a shirt) print designs, etc. Such errors could otherwise tarnish the reputation of the merchant, the hub entity, and/or the online storefront. Furthermore, example embodiments consistent with the present description can be used to help eliminate, or at least reduce, returned products. This, in turn, avoids wasted shipping costs. Indeed, avoiding wasted shipping should help avoid wasting fuel (which should help avoid undesired climate change). Example embodiments consistent with the present description can be used detect print provider errors, help the print provider avoid errors, and/or prevent shipping products (e.g., shirts) with errors, such as those listed above.

What is claimed is:

1. A computer-implemented method comprising:
   a) receiving one or more captured images from a still or video camera in a given area;
   b) extracting, within the one or more captured images, an image of a design printed on a garment;
   c) searching, within a database, for order information associated with the garment based on the image of the design printed on the garment;
   d) receiving the order information associated with the garment from the database;
   e) determining at least one score as a function of at least
      (i) the image of the design printed on the garment, and
      (ii) image information associated with the order information; and
   f) controlling operation of a shipping label printer based on the at least one score.

2. The computer-implemented method of claim 1 further comprising:
   determining whether or not a garment is included in the one or more captured images, wherein acts b)-f) are performed responsive to a determination that a garment is included in the one or more captured images.

3. The computer-implemented method of claim 2 wherein the still or video camera has a field of view on a portion of means for conveying, and
   wherein the act of determining whether or not a garment is included in the one or more captured images includes tracking the garment on the means for conveying as the garment moves across the field of view of the still or video camera.

4. The computer-implemented method of claim 3 wherein the means for conveying supports the garment such that the image of the design printed on the garment is substantially perpendicular to an optical axis of an objective lens of the still or video camera.

5. The computer-implemented method of claim 1 further comprising:
   receiving environmental information about the given area from at least one sensor, wherein the at least one score determined is also a function of the environmental information received.

6. The computer-implemented method of claim 5 wherein the environmental information includes a lighting temperature.

7. The computer-implemented method of claim 1 further comprising:
   detecting at least one property of the garment, wherein the at least one score determined is also a function of the at least one property of the garment detected.

8. The computer-implemented method of claim 7 wherein the at least one property of the garment includes at least one of (A) a dominant fabric color of the garment, (B) a style of the garment, (C) a size of the garment, and/or (D) a garment fabric.

9. The computer-implemented method of claim 1, further comprising:
   determining whether or not to ship the garment using at least some of the at least one score.

10. The computer-implemented method of claim 1, wherein the at least one score includes a plurality of scores, and
    wherein the act of controlling operation of the shipping label printer based on the at least one score includes
    1) determining whether or not each of the plurality of scores meets a corresponding quality threshold or passes a binary pass-or-fail property test, and
    2) responsive to a determination that any one of the plurality of scores does not meet its corresponding quality threshold or does not pass its corresponding binary pass-or-fail property test, control the shipping label printer to not print a shipping label, and
    otherwise, responsive to a determination that each and every one of the plurality of quality scores meets its corresponding quality threshold and passes its corresponding binary pass-or-fail property test, control the shipping label printer to print a shipping label.

11. The computer-implemented method of claim 1 wherein the order information is associated with the garment by matching a pattern of the image of the design printed on the garment with a design of the image information associated with the order information.

12. The computer-implemented method claim 1 wherein the one or more captured images including the garment also includes a captured optical code, and
    wherein the order information is associated with the garment using the optical code captured.

13. The computer-implemented method of claim 1, wherein the at least one score includes a plurality of components, the computer-implemented method further comprising:
    determining whether or not each of the plurality of components meets a corresponding quality threshold or passes a corresponding binary pass-or-fail test, and
    responsive to a determination that any one of the plurality of quality components does not meet its corresponding quality threshold or does not pass its corresponding binary pass-or-fail test, controlling the shipping label printer to not print a shipping label, and
    otherwise, responsive to a determination that each and every one of the plurality of quality components meets its corresponding quality threshold and passes its corresponding binary pass-or-fail test, controlling the shipping label printer to not print a shipping label.

14. The computer-implemented method of claim 13, wherein the at least one score includes at least two scores selected from a group consisting of (A) a score indicative of how closely an image of the captured design printed on the garment matches image information associated with the order, (B) a binary pass-or-fail component indicating whether or not a fabric color of the garment matches a fabric color associated with the order, (C) a binary pass-or-fail component indicating whether or not a size of the garment matches a size associated with the order, (D) a binary pass-or-fail component indicating whether or not a style of the garment matches a style associated with the order, (E) binary pass-or-fail component indicating whether or not the garment fabric matches the fabric associated with the order, (F) a score indicative of whether or not a location of the image printed on the garment matches a garment location associated with the order, (G) a score indicative of whether or not a size of the image printed on the garment matches a design size associated with the order, and (H) a score indicative of whether or not an orientation of the image printed on the garment matches a design orientation associated with the order.

15. The computer-implemented method of claim 1, further comprising:
    making an overall pass/fail determination using the score;
    storing the overall pass/fail determination on a first non-transitory storage system; and
    storing the score and information used to determine the score on a second non-transitory storage system.

16. The computer-implemented method of claim 15, wherein the first non-transitory storage system is provided at a first physical location which includes the given area, and wherein the second non-transitory storage system is provided at a second physical location remote from the first physical location.

17. The computer-implemented method of claim 16 wherein the first physical location is controlled by a print provider,
    wherein the second physical location is controlled by a hub entity, and
    wherein the hub facility interfaces with each of (i) the print provider, and (ii) a merchant/designer who owns intellectual property in the design printed on the garment.

18. The computer-implemented method of claim 1 wherein the one or more captured images include more than one frame of video, and
    wherein the image of the design printed on the garment is an image synthesized from the more than one frame of video.

19. The computer-implemented method of claim 1, further comprising:
    determining whether or not to provide the garment to an end customer using at least some of the at least one score.

20. The computer-implemented method of claim 19, wherein the at least one score includes a plurality of scores, and
    wherein the act of determining whether or not to provide the garment to an end customer using at least some of the at least one score includes
    1) determining whether or not each of the plurality of scores meets a corresponding quality threshold or passes a binary pass-or-fail property test, and
    2) responsive to a determination that any one of the plurality of scores does not meet its corresponding quality threshold or does not pass its corresponding binary pass-or-fail property test, not providing the garment to the end customer, and
    otherwise, responsive to a determination that each and every one of the plurality of quality scores meets its corresponding quality threshold and passes its corresponding binary pass-or-fail property test, providing the garment to the end customer.

21. A computer-implemented method comprising:
    a) receiving one or more captured images from a still or video camera in a given area;
    b) extracting, within the one or more captured images, an image of a design printed on a garment;
    c) searching, within a database, for order information associated with the garment based on the image of the design printed on the garment;
    d) receiving the order information associated with the garment from the database;
    e) determining whether or not the image of the design printed on the garment matches image information associated with the order information; and
    f) responsive to a determination that the image of the design printed on the garment does match image information associated with the order information,
      1) determining whether the image of the design printed on the garment passes or fails at least one test using the image information associated with the order information, and
      2) responsive to a determination that the image of the design printed on the garment passes the at least one test,
        controlling a shipping label printer to print a shipping label,
        storing a pass indication on a first non-transitory storage system at a first location, and
        storing information about the determination of whether the image of the design printed on the garment passes or fails the at least one test on a second non-transitory storage system at a second location, wherein the second location is remote from the first location, and
      otherwise, responsive to a determination that the image of the design printed on the garment fails the at least one test,
        preventing the shipping label printer from printing a shipping label,
        storing a failure indication on the first non-transitory storage system, and
        storing information about the determination of whether the image of the design printed on the garment passes or fails the at least one quality test on the second non-transitory storage system; and
    otherwise, responsive to a determination that the image of the design printed on the garment does not match image information associated with the order information, preventing the image of the design printed on the garment from being stored on any one of the first and second non-transitory storage systems.

22. The computer-implemented method of claim 21 wherein the first physical location is controlled by a print provider,
    wherein the second physical location is controlled by a hub entity, and
    wherein the hub interfaces with each of (i) the print provider, and (ii) a merchant/designer who owns intellectual property in the design printed on the garment.

23. Apparatus comprising:
    a) a still or video camera;
    b) at least one processor; and
    c) a computer-readable storage device storing processor-executable instructions which, when executed by the at least one processor, cause the at least one processor to execute a method including
      1) receiving one or more captured images from the still or video camera in a given area;
      2) extracting, within the one or more captured images, an image of a design printed on a garment;

3) searching, within a database, for order information associated with the garment based on the image of the design printed on the garment;
4) receiving the order information associated with the garment from the database;
5) determining at least one score as a function of at least (i) the image of the design printed on the garment, and (ii) image information associated with the order information; and
6) controlling operation of a shipping label printer based on the at least one score.

24. The apparatus of claim 23 further comprising:
d) a light source;
e) at least one objective optical element arranged between the garment and the still or video camera; and
f) a polarization filter arranged between the garment and the still or video camera.

25. A non-transitory computer-readable storage medium storing processor-executable instructions which, when executed by at least one processor, cause the at least one processor to perform a method comprising:
a) receiving one or more captured images from a still or video camera in a given area;
b) extracting, within the one or more captured images, an image of a design printed on a garment;
c) searching, within a database, for order information associated with the garment based on the image of the design printed on the garment;
d) receiving the order information associated with the garment from the database;
e) determining at least one score as a function of at least (i) the image of the design printed on the garment, and (ii) image information associated with the order information; and
f) controlling operation of a shipping label printer based on the at least one score.

\* \* \* \* \*